(12) United States Patent
Wertheim et al.

(10) Patent No.: US 8,397,665 B2
(45) Date of Patent: Mar. 19, 2013

(54) DEVICE FOR IMPARTING GRADATIONS OF TINT DENSITY ON A PLASTIC OPHTHALMIC LENS

(76) Inventors: Herbert A. Wertheim, Miami, FL (US); William F. Moore, Miami, FL (US); Phillip R. Bartick, Miami, FL (US)

( * ) Notice: Subject to any disclaimer, the term of this patent is extended or adjusted under 35 U.S.C. 154(b) by 319 days.

(21) Appl. No.: 12/613,859

(22) Filed: Nov. 6, 2009

(65) Prior Publication Data

US 2011/0107965 A1   May 12, 2011

(51) Int. Cl.
*B05C 3/00* (2006.01)
*B05C 11/00* (2006.01)
*B05D 3/00* (2006.01)
*B05D 5/06* (2006.01)

(52) U.S. Cl. .................. 118/416; 118/694; 427/2.24
(58) Field of Classification Search .................. None
See application file for complete search history.

(56) References Cited

U.S. PATENT DOCUMENTS

| 4,267,208 | A | * | 5/1981 | Ireland ........................ 427/154 |
| 4,710,199 | A | | 12/1987 | Suter |
| 4,915,986 | A | | 4/1990 | Elias et al. |
| 5,201,955 | A | | 4/1993 | Chika et al. |
| 2004/0033306 | A1 | * | 2/2004 | Bouchier et al. ............... 427/2.1 |
| 2009/0020434 | A1 | * | 1/2009 | Susaki et al. .................. 205/239 |

\* cited by examiner

*Primary Examiner* — Dah-Wei Yuan
*Assistant Examiner* — Charles Capozzi

(57) ABSTRACT

A device for imparting a curved gradation of tint density on an ophthalmic or optical lens is described. This gradient-tinting device utilizes both vertical movement and rotation about the vertical axis of the lens as it moves into a tinting solution.

3 Claims, 1 Drawing Sheet

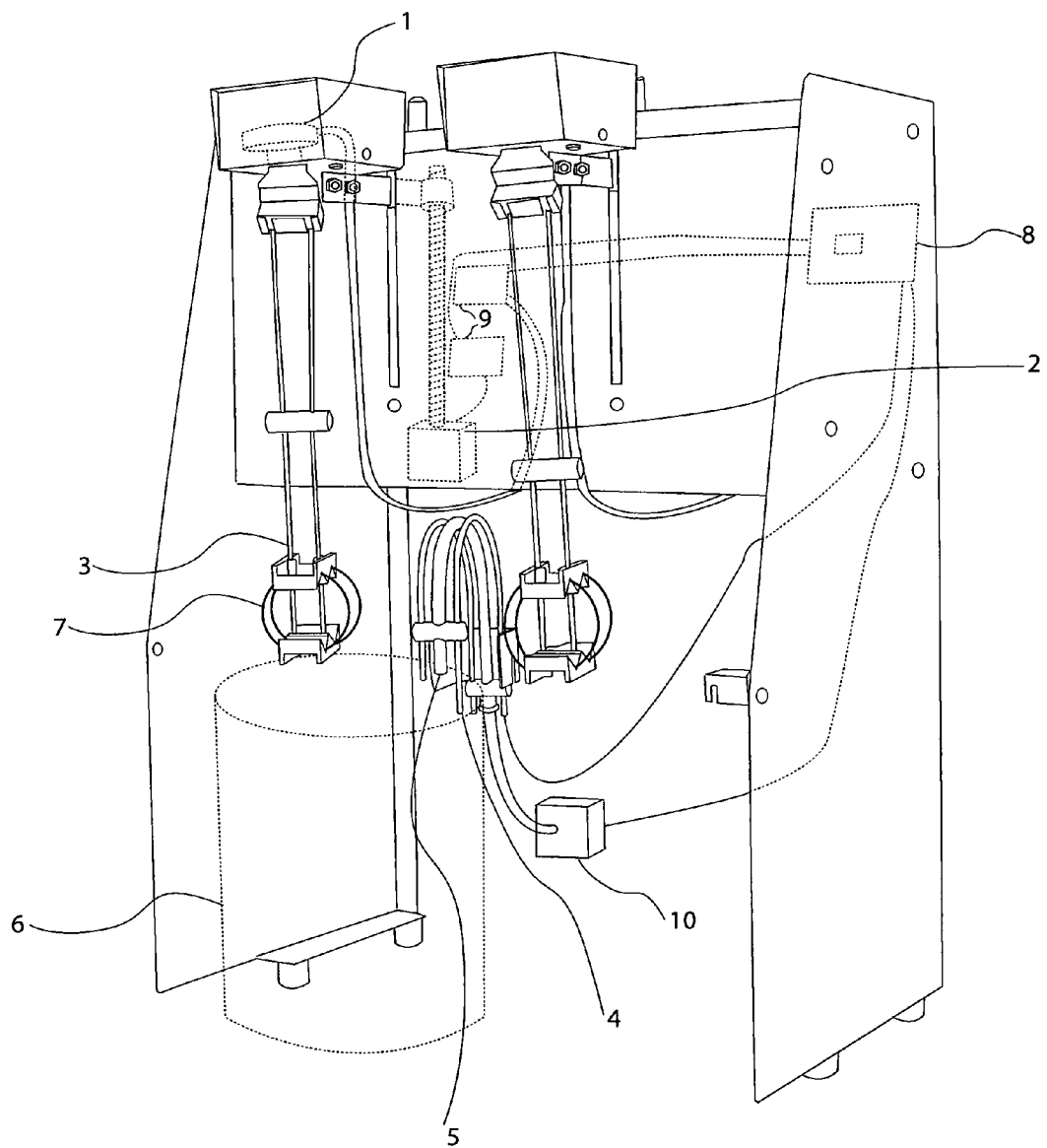

DEVICE FOR IMPARTING GRADATIONS OF TINT DENSITY ON A PLASTIC OPHTHALMIC LENS

BACKGROUND

1. Field of the Invention

The invention relates to a device to be used by optometry or optical workers to apply a gradation of tint density to plastic or other materials for optical or ophthalmic lenses. This is desirable since the amount of light entering from above is typically greater than that entering from horizontally or below, hence a greater tint density in the upper portion of the lens will reduce glare. Applying gradations of tint density by optical laboratory workers to lenses has been a common practice.

2. Description of Related Art

Many gradient tinting devices have been used in the past to create gradations of tint density on plastic ophthalmic lenses. In January of 1981, Brain Power Incorporated's Dr. Herbert Wertheim and Dr. Philip Bartick introduced the BPI Computer Gradient, a microprocessor controlled stepper motor powered system, which lowered the lens into a heated bath containing water based tint. Elias and Chika in 1990 (U.S. Pat. No. 4,915,986) patented a similar device. In 1987, Suter (U.S. Pat. No. 4,710,199) described a tinting system which applied ultrasonic energy to the tint bath in order to agitate the fluid and produce a more uniform solid or gradient tinted lens. In 1993, Chika and Elias (U.S. Pat. No. 5,201,955) described a device for producing an annular gradation of tint density on a plastic ophthalmic lens by vertically reciprocating the lens in and out of a tint bath while rotating the lens about an axis central to and orthogonal to the plane of the lens.

BRIEF SUMMARY OF THE INVENTION

The device herein described differs from those mentioned above in that the vertically mounted lens is rotated about the vertical axis as the lens is gradually lowered vertically into the heated tint solution. The rotating lens acts as an impeller, the centrifugal force exerted on the liquid tinting solution causes a meniscus to form on the surface of the tint, lower in the middle and higher near the edge of the tank containing tint solution, leading to a curved shape to the density gradient. The agitation of the fluid on the lens also leads to a more uniform tint. The agitation will also dislodge any particles or air bubbles, which might otherwise have adhered to the lens surface causing blemishes. The rotation about the vertical axis may be varied in speed so as to alter the shape of the meniscus. The rotation may be unidirectional or reverse periodically in order to provide greater agitation to the tinting solution. In the preferred embodiment, both the lowering of the lens into the tint solution and the rotation about the vertical axis are performed under microprocessor control using stepper motors to provide the motion.

Accordingly, several objects and advantages of this device for producing a gradation of tint density on a lens are:

(a) to produce a lens that has a meniscus density gradient, which is lower in the center and higher on the edges when being produced; when righted to put in frames the center part of the lens color is higher than the edges of the density gradient in order to give a more uniform visual field and a more pleasing cosmetic coloration;

(b) to produce a density gradation of tint which is more uniform;

(c) to produce a density gradation of tint with no blemishes or spots due to adhesion of tint particles or air bubbles;

(d) to produce a density gradation of tint which will be absorbed more rapidly into the lens due to the lens's surface being in contact with more tint molecules as a result of its rotation through the tint solution;

(e) to produce a different type of fashion lens that would be used in fashionable eye glasses or sunglasses;

(f) to use a microcontroller to enable detection of fluid level in tinting tanks for control and water replenishing purposes.

BRIEF DESCRIPTION OF THE DRAWING

FIG. 1 shows a perspective view of a microcontroller controlled stepper motor driven device which will produce the type of gradation of tint density described above.

REFERENCE NUMERALS IN DRAWINGS

1. Lens holder spinning motor
2. Lens holder lowering motor and lead screw
3. Conductive lens holder
4. Tank full sensor
5. Tank refill tube
6. Tint bath tank containing tinting solution
7. Tintable plastic ophthalmic lens
8. Microcontroller board with a programmable microcontroller which has I/O (input/output) ports
9. Motor driver board
10. Tank refill valve

DETAILED DESCRIPTION OF THE INVENTION

The device lowers a lens holder 3, spinning about its vertical axis, into a heated tint bath tank 6, containing heated, water based tinting solution. The tinting solution consists of a mixture of azo and anthraquinone dyes with surfactants in water. In the preferred embodiment, the dyes are mixtures of C.I. Disperse Yellow 3, C.I. Disperse Blue 3 and C.I. Disperse Red 1. In the preferred embodiment the tinting solution consists of a mixture of Sodium-N-Methyl-N-Oleoyl Taurate surfactant material with the dyes and water, which are then heated to a temperature of 96 C.

In the preferred embodiment a BPI Lens Holder II, or conductive equivalent thereof, holding two tintable plastic lenses, is spun about a vertical axis using either a Haydon Switch E36461 stepper motor or a Hennkwell HS100 AC Gearmotor or any other similar motor 1. The spinning lens holder 3 is lowered into the heated tinting solution by a stepper motor such as a Haydon Switch E36461 or Haydon Switch E43H6Q stepper motor turning a threaded lead screw 2. In the preferred embodiment, the stepper motors are driven by a stepper motor driver board such as the BPI Stepper Driver Board, which in turn is controlled by a software program contained in a programmable microcontroller such as a BPI GP32 Microcontroller Board. When an ac gear motor 1 is used to spin the lens holder 3, an ac motor driver board 9 such as the BPI Mod Con Board regulates its spinning action under the control of the BPI GP 32 Microcontroller Board.

If the lens holder is being spun by a stepper motor 1, a software program of the microcontroller board 8 regulates the vertical axis spinning rate to a value between 0 and 50 RPM, the preferred value being 30 RPM. This spinning rate is adjusted, based on the size and shape of the lenses, here acting as impellers, to produce a meniscus on the surface of the tinting solution. This fluid meniscus, depressed in the center while higher at the edges of the tint solution container, produces the characteristic curve of the tint density gradation on the lenses. The tint density produced on the lenses, when they are inverted for placement in eyeglass frames, will have greater tint density further down at the edges than at the center of the lens. The microcontroller software program also controls the lowering rate of descent of the lenses/lens holder into the tinting solution so as to obtain the overall desired gradation of tinting density on the lenses. Lowering rates are variable, extending from 0.0 cm/sec to 2.0 cm/sec with the preferred embodiment incorporating a variably accelerated rate extending from 0.01 cm/sec at the start of the dipping process to 1.0 cm/sec at the end of the dipping process.

Many microcontrollers incorporated in microcontroller boards 8 such as the BPI GP32 Microcontroller Board have I/O input ports which may also be used to sense the point where a conducting lens holder touches the partially conducting, grounded tinting solution. By selecting an I/O read port on the microcontroller such as the Motorola 68HC908GP32 of the microcontroller board 8 which is internally pulled up to 5V, which is its supply voltage, using its high impedance internal resistance, the port will then be pulled down to digital ground when the conductive lens holder, which is electrically attached to the port, touches the grounded tinting solution. Thus, the microcontroller's software program which initially lowers the lens holder rapidly towards the tinting solution will sense when the lens in the lens holder has reached the tinting solution and the actual lowering rates of the gradation tinting cycle will then commence.

Additionally, another internally pulled up I/O input port of the microcontroller on the microcontroller board 8 may be used to sense the level of the conductive tinting solution in the tinting tanks into which the lens holder is being lowered. A sensor probe 4 which is initially ungrounded may be electrically connected to a pulled up I/O input port and situated in a position where the conductive, grounded tinting solution just touches it when the liquid level in the tank is proper. The heated tinting solution will evaporate water with time and the level of the tinting solution will drop. When the level gets below that of the sensor probe 4, the port will no longer be grounded through the conductive tinting solution and will be pulled up, signaling a software program in the microcontroller on the microcontroller board 8 to open a water valve 10 connected to the tank refill tube 5 into that tank, refilling it.

We claim:

1. A device to produce a gradation of tint density on a plastic ophthalmic lens comprising:
a lead screw connected to a first motor to lower a vertically oriented lens holder which holds vertically mounted lenses being spun by a second motor about its vertical axis into a heated tint bath containing water based tinting solution that is conducting, the tint bath consisting of a mixture of azo and anthraquinone dyes with surfactants in water; and wherein said motors are controlled by a software program of a programmable microcontroller; and the software program of the microcontroller board configured to regulate the vertical axis spinning rate to a value between 0 and 50 RPM; and the spinning rate being adjusted, based on the size and shape of the lenses, to produce a meniscus on the surface of the tinting solution that is depressed in the center while higher at the edges of the tint bath to produce a curved tint density gradation on the lenses having a greater tint density further down at the edges than at the center of the lens; and the software program of the microcontroller board is also configured to control the lowering rate of descent of the lens holder into the tinting solution so as to obtain the desired gradation of tinting density on the lenses.

2. A device according to claim 1 wherein I/O (input/output) input ports of the microcontroller sense a point where a conducting lens holder touches the tinting solution based on the input port of the microcontroller programmed to be internally pulled up to its supply potential and then be pulled down to digital ground when the conductive lens holder, which is electrically attached to the port, touches the grounded tinting solution; and the microcontroller software program being configured to initially lower the lens holder down rapidly, and then commence predetermined lowering rates when the lens holder reaches the tinting solution.

3. A device according to claim 2, wherein another I/O input port of the microcontroller on the microcontroller board is configured to control the level of the conducting tinting solution in the tinting bath into which the lens holder is lowered wherein a sensor probe connected to said I/O port and arranged in a position where the probe becomes grounded as it touches the conductive tinting solution when a liquid level in the bath is proper; and wherein the I/O input port becomes ungrounded and signals a software program of the microcontroller on a microcontroller board to open a water valve to refill the tinting bath when the heated tinting solution evaporates water with time and the level of the tinting solution drops below the position of the probe.

\* \* \* \* \*